Apr. 3, 1923.

O. B. GAUDIN 1,450,846

HAND CAR

Filed July 5, 1922

Oneil B. Gaudin
INVENTOR

BY Victor J. Evans
ATTORNEY

WITNESS:

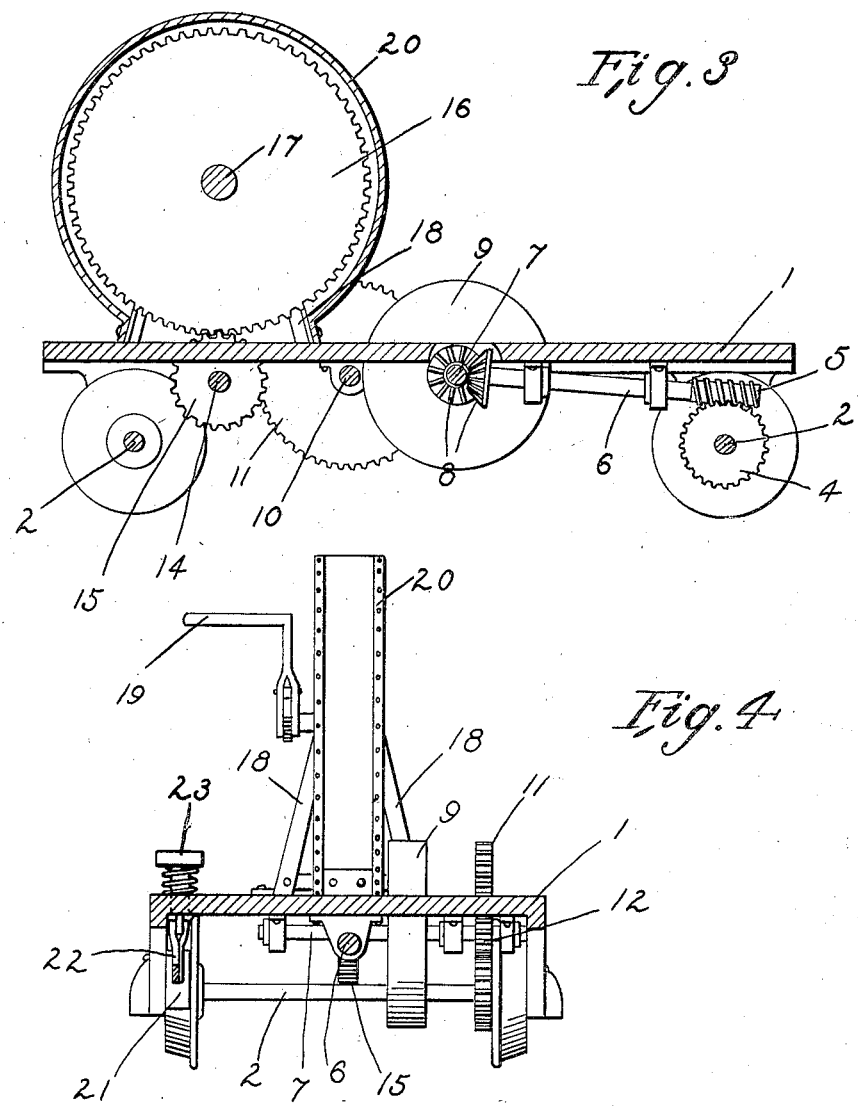

Patented Apr. 3, 1923.

1,450,846

UNITED STATES PATENT OFFICE.

ONEIL B. GAUDIN, OF LAUREL, MISSISSIPPI.

HAND CAR.

Application filed July 5, 1922. Serial No. 572,819.

*To all whom it may concern:*

Be it known that I, ONEIL B. GAUDIN, a citizen of the United States, residing at Laurel, in the county of Jones and State of Mississippi, have invented new and useful Improvements in Hand Cars, of which the following is a specification.

This invention relates to improvements in hand cars for railroad tracks, the general object of the invention being to provide means whereby the car can be easily propelled by hand.

Another object of the invention is to provide an easily operated brake for the car.

This invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings wherein like characters denote like or corresponding parts throughout the several views, and in which:—

Figure 3 is a longitudinal sectional view taken on line 3—3 of Figure 1.

Figure 4 is a transverse sectional view taken on line 4—4 of Figure 1.

Figure 1:
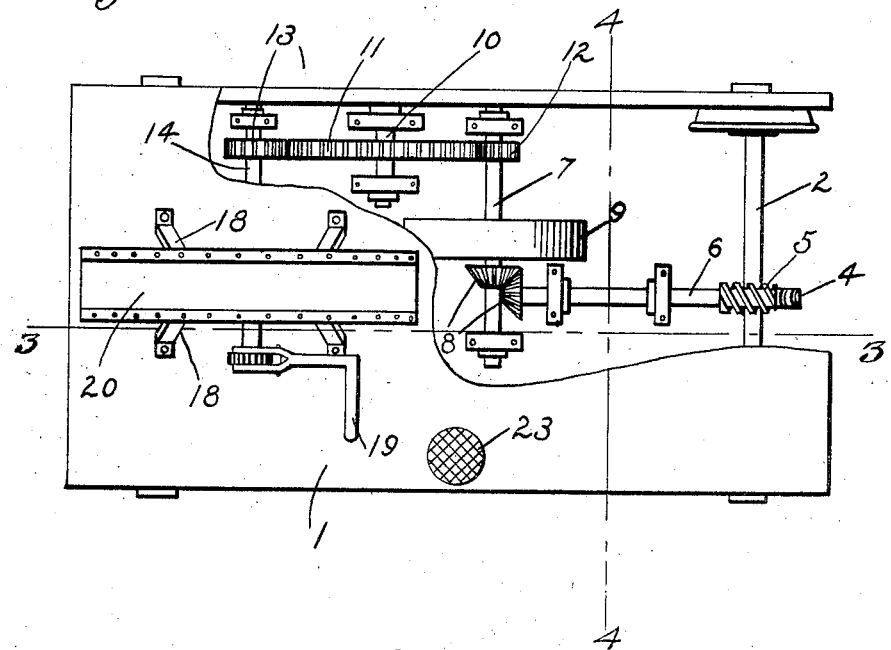
Figure 1 is a plan view of the invention.
Figure 2:
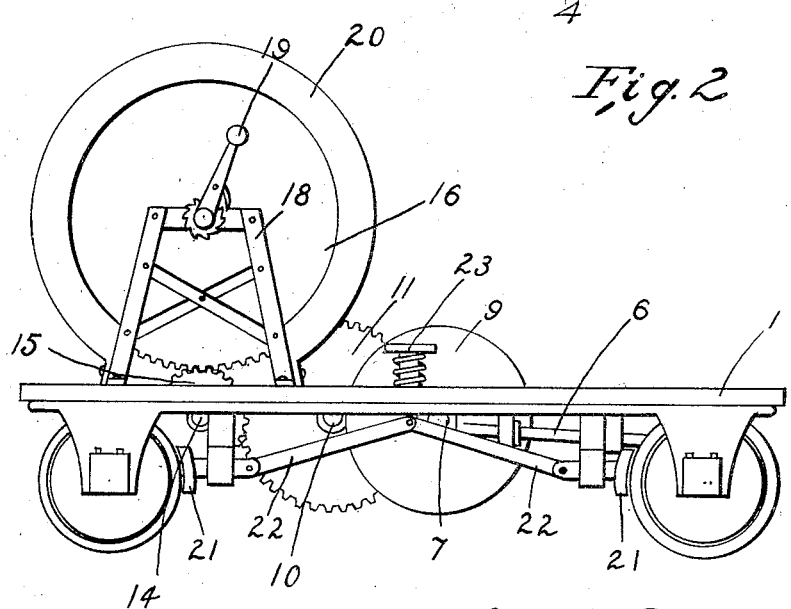
Figure 2 is a side view.

In these views 1 indicates the platform which is supported upon the axles 2, these axles carrying wheels 3. One of the axles is provided with a worm 4 which is engaged by a worm gear 5 on its shaft 6 which is suitably supported from the platform. A shaft 7 is also journaled in the platform and this shaft is geared to the shaft 6 by the beveled gears 8. A fly wheel 9 is arranged on the shaft 7. A stub shaft 10 is carried by the platform and this stub shaft carries a large gear 11 which meshes with a pinion 12 on the shaft 7 and with a pinion 13 on the shaft 14. This shaft 14 carries a pinion 15 which meshes with a large toothed wheel 16 carried by the shaft 17 which is journaled on the supports 18 which extend upwardly from the platform. The wheel 16 is provided with a ratchet handle 19 so that it can be rotated by hand and it is also provided with a guard 20. Brake shoes 21 are provided for the wheels at one side of the platform, these shoes being carried by the spring controlled levers 22 which are actuated by the foot pedal 23.

From the foregoing it will be seen that by rotating the wheel 16 by hand the shaft 2 which is provided with the worm is revolved through the shafting and gears shown and thus the car will be propelled along the track. The car can be stopped at any time by depressing the foot lever 23 to apply the brakes. The car can be propelled by one man so that a motor or the like is not necessary.

It is thought from the foregoing description that the advantages and novel features of my invention will be readily apparent.

I desire it to be understood that I may make changes in the construction and in the combination and arrangement of the several parts, provided that such changes fall within the scope of the appended claims.

What I claim is:—

1. A hand car of the class described comprising a wheel supported platform, axles for the wheels, one of the axles having a worm gear thereon, a shaft, a worm thereon meshing with the worm gear, a second shaft, a fly wheel on said second shaft, gears connecting said second shaft with the first shaft, a driven shaft, gears connecting the same with the second shaft, a toothed hand wheel supported above the platform, a gear on the driven shaft meshing with the teeth of said wheel and a shield for said wheel.

2. A hand car of the class described comprising a wheel supported platform, axles for said wheels, one of said axles having a worm gear thereon, a shaft supported from the platform and having a worm gear thereon designed to engage the first mentioned worm gear, a second shaft journalled in the platform and geared to the first mentioned shaft, a fly wheel arranged on said second shaft, gears connecting said second shaft with the first shaft, a driven shaft provided for said car and gears connecting the same with the second shaft, a toothed hand wheel supported above the platform, said driven shaft having a gear which meshes with the teeth of said wheel and a guard provided for said wheel, a ratchet handle provided for the wheel for rotating the latter, brake shoes provided for the wheels at one side of the platform, spring controlled levers having a foot pedal for actuating the same and said levers carrying the brake shoes.

3. A hand car of the class described comprising a wheel supported platform, axles for said wheels, one of the axles being provided with a worm gear, a shaft and a worm provided on the last mentioned member and designed to mesh with the worm gear, a second shaft, a fly wheel on the said second shaft, gears connecting said second shaft with the first mentioned shaft, a toothed hand wheel rotatably mounted and supported on said platform, and means for communicating movement of said wheel to the axle and brake mechanism associated with the wheel, brake shoes provided for the wheels at one side of the platform, spring control levers including a foot pedal for actuating the same, and said levers are designed to carry the brake shoes.

In testimony whereof I affix my signature.

ONEIL B. GAUDIN.